Figure 1:
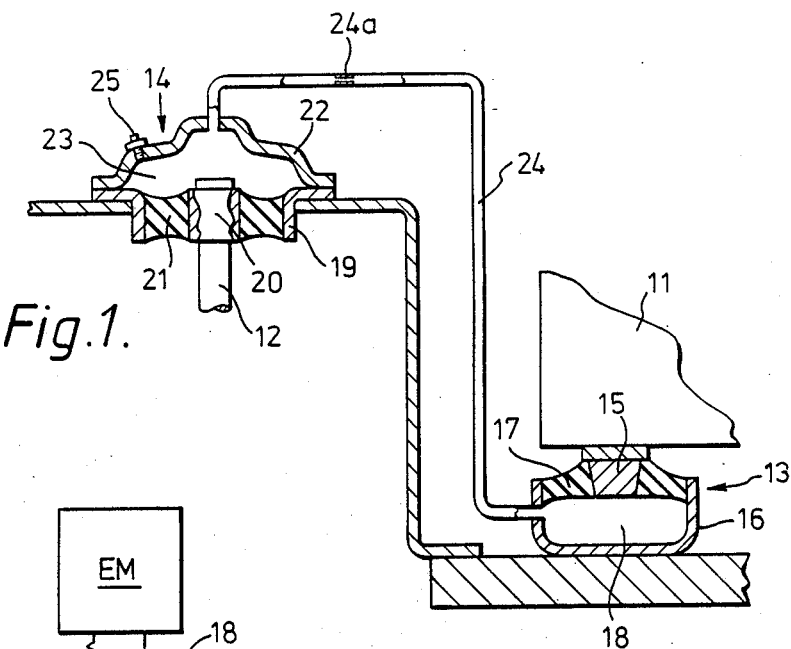

United States Patent [19]

Best et al.

[11] Patent Number: 4,788,949
[45] Date of Patent: Dec. 6, 1988

[54] MOUNTING ARRANGEMENT FOR VEHICLE ENGINES

[75] Inventors: Anthony Best, Westbury; Kenneth V. Hunt, Melksham; Raymond Hoole, Trowbridge, all of England

[73] Assignee: BTR PLC a British Company, United Kingdom

[21] Appl. No.: 848,277

[22] Filed: Apr. 4, 1986

[51] Int. Cl.$^4$ .......................... F02B 75/06; F02F 9/04
[52] U.S. Cl. .................. 123/192 R; 180/300; 180/902; 267/140.1
[58] Field of Search ............ 123/192 R; 180/291, 180/312, 902, 300; 267/186, 140.1; 248/562, 636

[56] References Cited

U.S. PATENT DOCUMENTS

| 3,202,388 | 8/1965 | Goodwin | 248/636 |
|---|---|---|---|
| 3,957,128 | 5/1976 | LeSalver et al. | 180/902 |
| 3,958,654 | 5/1976 | LeSalver et al. | 180/902 |
| 4,359,716 | 11/1982 | Miyamaru et al. | 180/902 |
| 4,611,782 | 9/1986 | Ushijima et al. | 180/300 |

FOREIGN PATENT DOCUMENTS

| 136700 | 4/1985 | European Pat. Off. | 180/291 |
|---|---|---|---|
| 2821493 | 11/1979 | Fed. Rep. of Germany. | |
| 2946516 | 5/1981 | Fed. Rep. of Germany. | |
| 3509000 | 9/1985 | Fed. Rep. of Germany. | |
| 1008798 | 5/1952 | France. | |
| 29514 | 2/1984 | Japan | 180/300 |

Primary Examiner—Willis R. Wolfe, Jr.
Attorney, Agent, or Firm—Stevens, Davis, Miller & Mosher

[57] ABSTRACT

A vehicle engine mounting arrangement wherein a pair of interconnected fluid-tight chambers containing gas are employed, one arranged between the engine and the body and the other arranged between the body and the suspension system. The two chambers are each deformable under load and changes of pressure which are communicated between the chambers act on the respective chambers so that dynamic forces exerted on the body via one chamber tend to be counteracted by correspondingly oppositely directed forces exerted on the body via the other chamber, hence reducing shake.

18 Claims, 5 Drawing Sheets

MOUNTING ARRANGEMENT FOR VEHICLE ENGINES

This invention relates to a mounting arrangement for a vehicle engine.

Conventionally, vehicle engines are mounted on the body of the vehicle which is itself supported by suspension units on the wheels of the vehicle. The body thus experiences not only vibrations from the engine through the engine mounts but also shocks from the road through the suspension units. At certain frequencies, typically between 5 and 15 Hz, the body and engine can oscillate out of phase, causing uncomfortable vibrations in the vertical direction which are sometimes known as "shake". Engine mounts with higher stiffness or more damping can reduce the problem of shake, but at the expense of noise isolation. Conventional engine mounting arrangements therefore have values of stiffness and damping which represent a compromise between shake and noise problems.

The present invention is based upon an appreciation of the idea of coupling together the engine and body mounts of a vehicle so that the body and engine are encouraged to move in phase. One approach, made in Peugeot British Pat. Nos. 1473750 and 1509940, proposes the introduction of an incompressible fluid communication between the body and engine mounts. The use of an incompressible fluid as a link between the mounts in this Peugeot system acts effectively like a positive mechanical connection between the mounts i.e. a displacement of one mount produces a corresponding displacement in the other mount.

The present invention offers a mounting arrangement which is aimed at reducing a "shake" while providing good noise isolation and which uses a completely different concept.

According to the invention there is provided a mounting arrangement for a vehicle engine of the kind comprising means for mounting the engine of the vehicle to the body of the vehicle, which mounting means comprises a first fluid-tight chamber of variable volume which contains fluid and which is arranged between the engine and the body so that the weight of the engine tends to reduce the volume of the chamber, means for supporting the body on the suspension system of the vehicle, which supporting means includes a second fluid-tight chamber of variable volume, which chamber contains fluid and is arranged so that the load of the body on the suspension system tends to reduce the volume of the chamber, and a fluid communication between the first and second chambers, characterized in that the fluid is a gas and relative movement between the engine and body or between the body and suspension system alters the pressure of the gas in one of the chambers, which change in gas pressure is communicated to the other of the chambers, the arrangement acting to tend to bring into phase the vibrational movements of the body and engine, the effective pressurised areas (as herein defined) of the mounting means and supporting means being approximately equal and the natural frequency of vibration of the body on the supporting means without the second chamber being approximately equal to the natural frequency of vibration of the engine on the effective gas spring (as herein defined).

The effective pressurised areas of the mounting and supporting means are defined as being equal if a given pressure in the mounting means produces between the engine and body the same force as is produced between the body and suspension system by the same given pressure in the suspension means.

The effective gas spring is defined as an equivalent spring which has the same effective stiffness at the mounting means as the gas contained in the first chamber in gas communication with the second chamber but with no relative movement between the body and suspension system.

Figure 2:
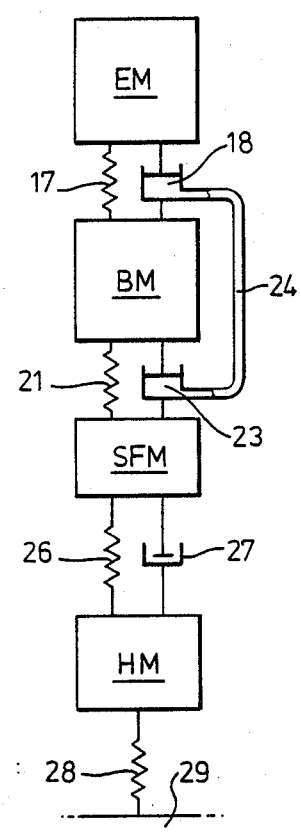
Figure 3:
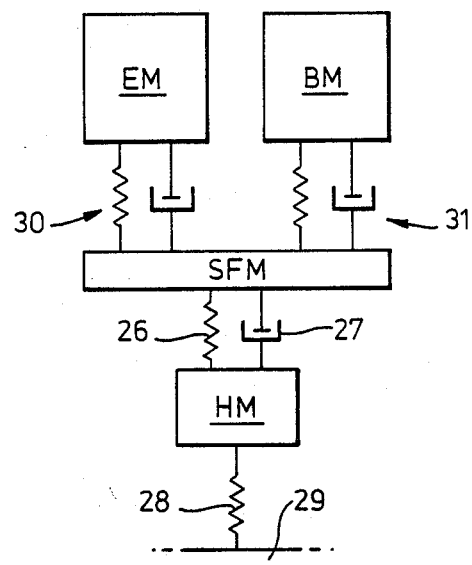
Figure 4:
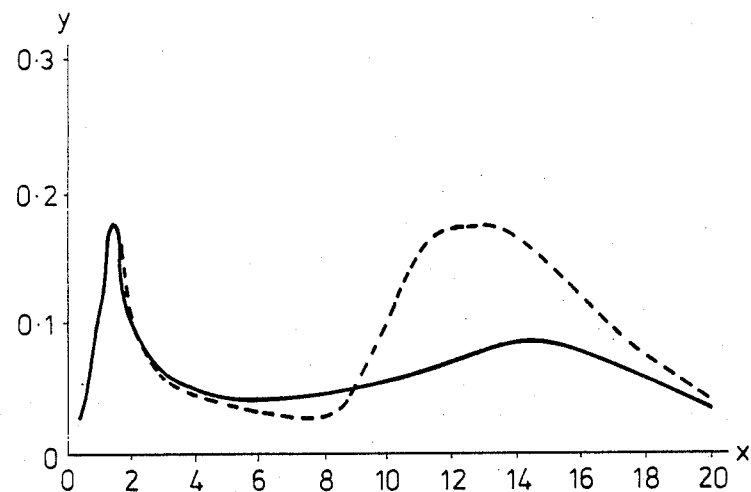
Figure 5:
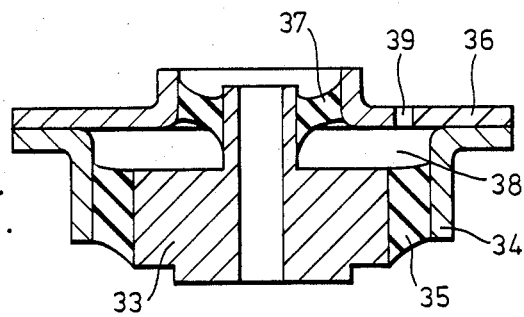
Figure 6A:
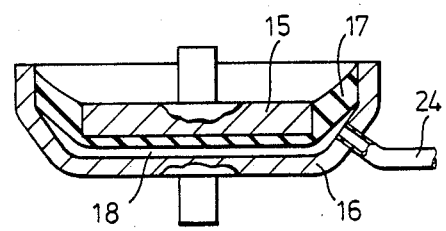
Figure 6B:
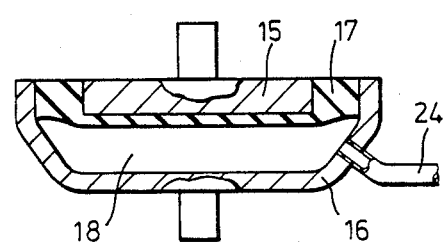
Figure 7:
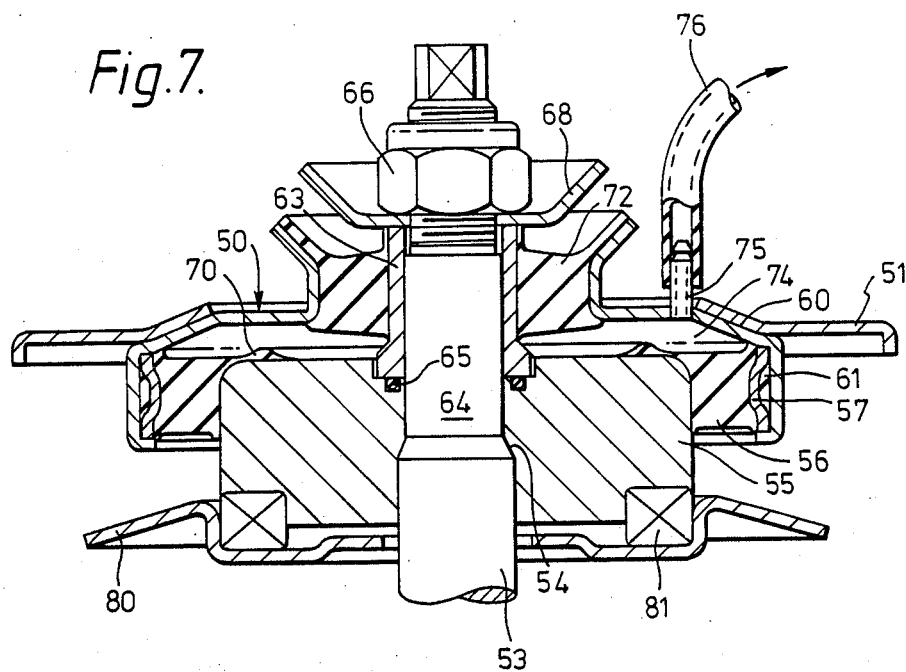
Figure 8:
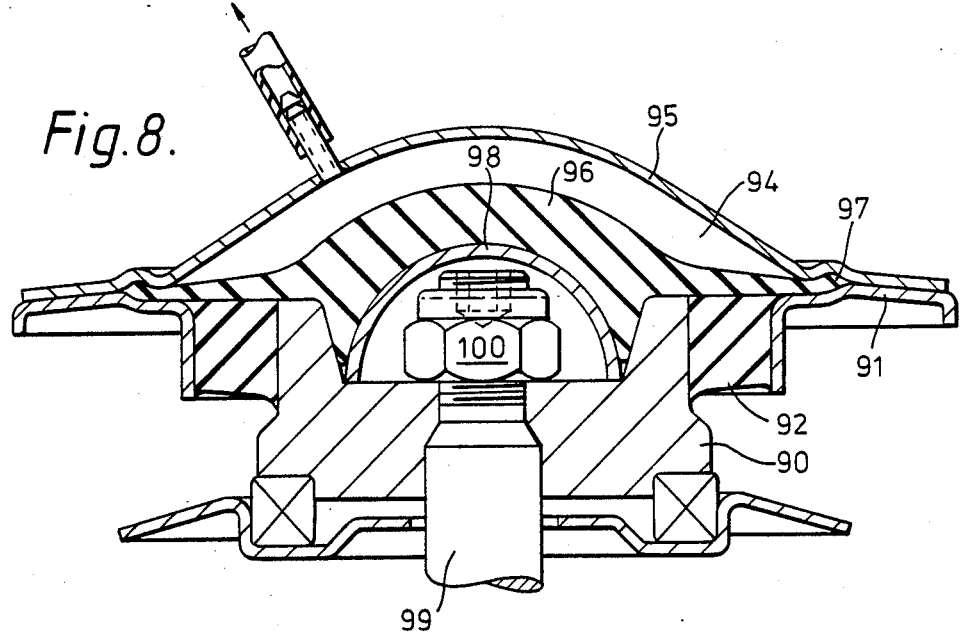
Figure 9:
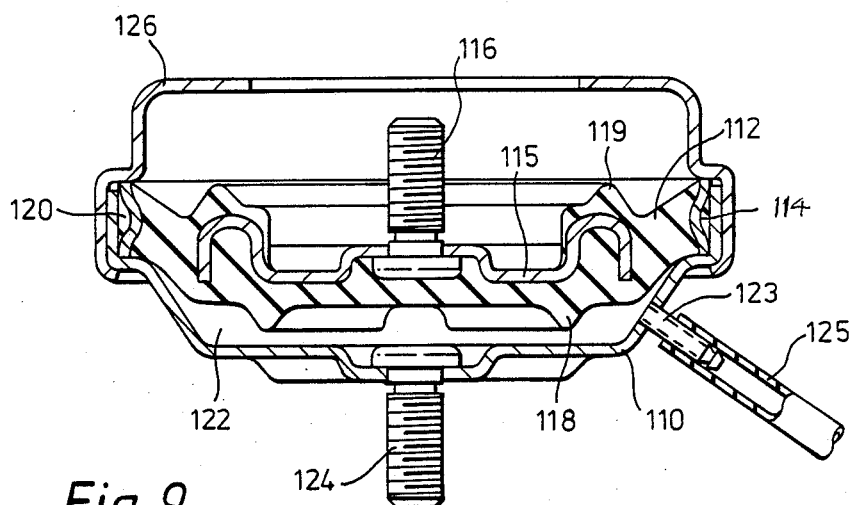
Figure 10:
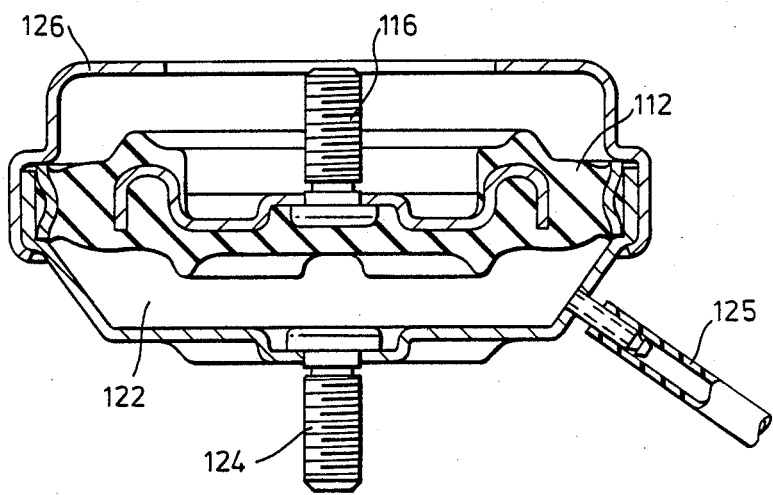
Figure 11:
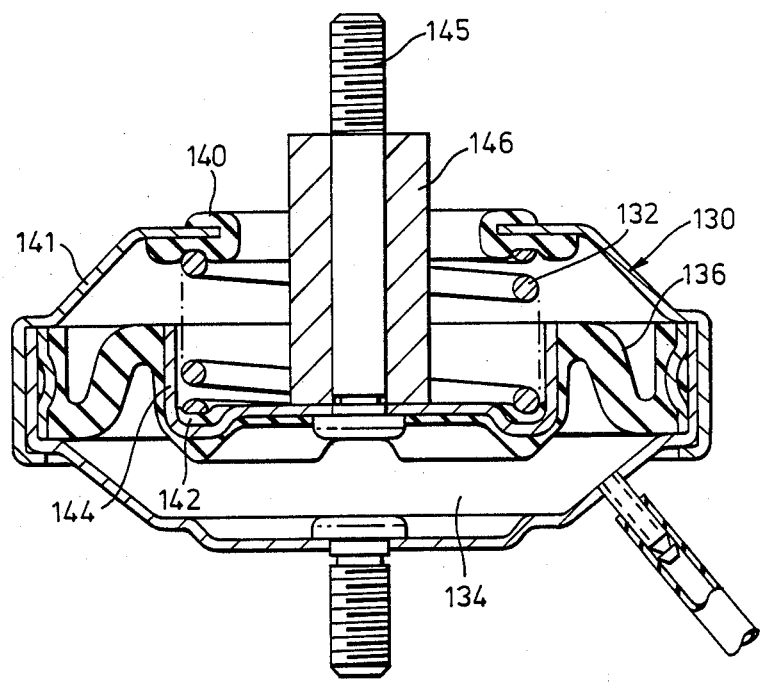

By way of example, embodiments of the invention will now be described with reference to the accompanying drawings, in which :

FIG. 1 is a diagrammatic representation of a vehicle engine mounting arrangement according to the invention, FIG. 2 is a diagram of an equivalent theoretical linear model which can be used for mathematical analysis, FIG. 3 is a further developed mathematical model, FIG. 4 is a graph of body acceleration against frequency, FIG. 5 is an alternative body mount, FIGS. 6a and 6b show an alternative engine mount, FIG. 7 illustrates a practical version of the body mount in FIG. 5, FIG. 8 illustrates an alternative practical version of the body mount, FIG. 9 shows a practical version of an engine mount as illustrated diagrammatically in FIG. 6a, FIG. 10 shows the engine mount of FIG. 9 in the state illustrated diagrammatically in FIG. 6b, and FIG. 11 shows a further alternative engine mount.

In FIG. 1, 10 represents the body of a vehicle, 11 is the engine and 12 is one of the suspension units, in this case a Macpherson-type strut, supporting the body on the vehicle wheels. 13 is one of the engine mounts connected between the engine 11 and the body 10, and 14 is one of the body mounts connecting the body to the wheels of the vehicle via the suspension unit 12.

The engine mount 13 includes upper and lower connectors 15 and 16 which are attached to the engine 11 and body 10 respectivley and which are themselves connected together by means of a flexible (e.g. elastomeric) annulus 17. Defined within the engine mount 13 is a gas-tight camber 18.

The body mount 14 includes outer and inner connectors 19 and 20 which are attached to the body 10 and suspension unit 12 repsectively and which are themselves connected together by means of a flexible (e.g. elastomeric) annulus 21. The mount 14 further includes a cap 22 which defines a gas-tight chamber 23 over the flexible annulus 21. The chambers 23 and 18 are in open communication with each other through conveniently air, under pressure. The gas in the chambers can be pressurised by means of a valve 25.

The engine mount 13 and body mount 14 are designed with their effective pressurised areas approximately equal so that the engine 11 is effectively supported directly on to the suspension unit 12. Thus, it will be seen that a downward force from the engine 11, tending to compress the engine mount 13, will cause an increase in the gas pressure inside the chamber 18. This will give rise to an equal increase in pressure in the chamber 23, via the pipe connections 24. Because the effective pressurised areas of the two mounts 13 and 14 are approximately equal, this means that the force from the engine 11 acting on the engine mount 13 will be balanced by an equal and opposite force from the suspension unit 12 acting on the body mount 14. It will be seen that, whereas in a conventional arrangement the body mount has to support not only the body but the engine as well, in the gas coupled engine mounting arrangement as described the engine is effectively supported by the suspension so that the body mount supports only the body.

The above described gas coupled engine mounting arrangement can be represented in an idealized way by a linear theoretical model as shown in FIG. 2. In FIG. 2 the mounting arrangement of FIG. 1 is represented by masses EM, BM, SFM and HM, springs 17, 21, 26 and 28 and piston and cylinder devices 18 and 23. Numbered items in FIG. 2 represent identically numbered items in FIG. 1. EM, BM, SFM and HM represent respectively the masses of the engine 11 (that part which bears on an engine mount 13), the vehicle body 10 (that part which bears on a suspension unit 12), the upper part of a suspension unit 12 and a wheel hub. 26 represents the main spring of a suspension unit 12, 27 is a dashpot representing the damper of the suspension unit 12, 28 represents the tyre and 29 the road surface. Piston and cylinder devices 18, 23 and pipe 24 represent the gas coupling system. Piston and cylinder devices 18, 23 each have areas equal to the effective piston areas of the engine mount 13 and body mount 14 respectively. 17 represents the spring stiffness of the flexible annulus of the engine mount 13 and 21 represents the spring stiffness of the flexible annulus of the body mount 14. The "subframe" mass SFM is made up of member 20 of the body mount 14 and the upper part of the suspension unit 12 to which it is connected.

It will be noted that FIG. 2 without the gas coupling system would represent a conventional vehicle engine mounting arrangement where the engine 11 is mounted simply by mounting 17 on to the body 10.

The uncomfortable vibrational effect known as "shake" is represented in the linear model by the amplitude of the acceleration of the mass BM resulting from a sinusoidal vibration of the road surface 29. Mathematical analysis of the linear models with and without the gas coupling system, each using typical values of the variables depicted, show that significant reduction in "shake" can be achieved with the gas coupled system compared with the conventional arrangement. Typical results obtained from such analysis are shown graphically in FIG. 4. In FIG. 4, the X axis measures frequency in Hz and the Y axis measures body acceleration in fractions of "g" (rms). The dotted line graph shows the performance of a conventional mounting arrangement and the full line graph shows the performance of the gas linked system. Clearly, the shake which occurs with the conventinal system at around 12 Hz is significantly less in the gas coupled system.

For the gas coupled system to be effective in reducing shake, the effective piston area of the engine mounting must be approximately equal to the effective piston area of the body mounting. Also, the natural frequency of vibration of the effective body mass BM on spring 21 along must be approximately equal to the natural frequency of vibration of the effective engine mass EM on the effective stiffness of the gas contained in 18 in the engine mount in open communication (via pipe 24) with the gas contained in 23 in the body mount. A gas coupled system which meets these criteria is referred to herein as a tuned system and the natural frequency of vibration discussed above is referred to herein as the turning frequency. FIG. 3 represents a mathematical model of a mechanical equivalent of FIG. 2 for a tuned system where the engine and body are both at the tuning frequency.

In FIG. 3, 31, which supports the body mass BM, represents the flexible annulus 21 of FIGS. 1 and 2, and 30, which supports the engine mass EM, represents the effective gas spring comprising 18, 23 and 24. Vertical vibration from the road 29 causes vertical vibration of the subframe mass SFM, which in turn causes vertical vibration of the engine and body masses EM and BM, on their respective supporting springs 30 and 31. As can be seen from FIG. 3, if the natural frequencies of the engine and body masses EM and BM on their respective springs 30 and 31 are equal, the vibrational movement of the engine and body masses will be in phase. Mathematical analysis of FIG. 3 shows that the body acceleration resulting from sinusoidal road vibration is similar to that shown by the full line graph in FIG. 4.

It will be seen with reference to FIGS. 2 and 3 that static and dynamic forces due to engine weight and engine mass are transmitted via the gas coupling system directly to the "subframe" which is at the top of the suspension spring 26, bypassing the body spring 21. The body spring 21 in a gas coupled system is therefore subjected to much lower forces than in a conventional mounting arrangement which means that the body spring can be of much lower spring stiffness. This lower spring stiffness of the body spring 21 has the benefical effect of reducing transmission of road noise through to the vehicle body.

In practice, in the gas coupled system shown in FIG. 1, it is necessary for the gas pressure to be in excess of atmospheric (typically 2 to 4 bar) in order to obtain a high enough tuning frequency (typically 5 to 8 Hz). To achieve this, the engine mount static stiffness (17 in FIG. 2) should be as high as possible to limit static deflection of the engine mount upwards due to the gas pressure. However, it is also desirable for the engine mount dynamic stiffness to be as low as possible to minimise the effects of imperfections in the tuning of the practical system. Such an engine mount having these desired characteristics is described below.

A feature of the gas coupled system is that the gas under pressure contributes significantly to the total stiffness of the engine and body mounts and therefore an economical mounting system results, particularly if the gas used is air.

In practice, the effective height of the gas chamber in the engine mount should be as high as possible compared with the height of the gas chamber in the body mount in order to provide good high frequency performance above the frequency at which shake occurs.

Mathematical analysis based on the models of FIGS. 2 and 3 indicates that optimum system performance at shake frequencies is obtained with a particular amount of damping in the interconnecting gas pipe 24. This can be achieved conveniently by a localized restriction 24a or reduction in diameter of the pipe.

FIG. 5 shows an alternative body mount to that shown in FIG. 1. The body mount in FIG. 5 is a self contained sealed unit. The suspension unit is fixed to an inner connector 33, and the mount is fixed to the body of the vehicle via an outer connector 34. A flexible (e.g. elastomeric) annulus 35 connects together the inner and outer connectors 33 and 34. A cap 36 is sealingly connected to the outer connector 34, and a further flexible (e.g. elastomeric) annulus 38 is connected between the cap and the inner connector 33, defining a gas-tight chamber 38. The chamber 38 is able to be put in communication with the gas-tight chamber in the engine mount via a hole 39, and suitable means is provided for pressurising the gas. As in the Figure 1 body mount, it will be seen that the volume of the chamber 38 alters as there is relative movement in the inner and outer connectors 33 and 34, and hence there is variation in the gas pressure link with the engine mount. Such a gas coupled body mount, sealed to make it gas-tight, can be assembled easily on to a vehicle, the top of the suspension unit rod protruding through the inner connector 33 from beneath and being accessible from above for securing with a nut, the mount being thus assembled onto the vehicle without disturbing the gas seal.

FIG. 6a shows a development of the engine mount shown in FIG. 1, and as the features of the mount are essentially the same as those of FIG. 1, a description need not be repeated. Corresponding elements of the mounts have been given similar reference numerals. The engine mount is shown in FIG. 6a in its pre-installation condition i.e. when it is not supporting an engine and chamber 18 does not contain gas under pressure. FIG. 6b shows the mount in its working condition supporting an engine in static equilibrum. Here the gas in the chamber 18 has been pressurised to, typically, 2 to 4 bar and the flexible annulus 17 is approaching its position of axial instability. This is due to a change from the pre-installed position of the annulus in FIG. 6a to the highly radially compressed state of the annulus in FIG. 6b. In such a condition of near axial instability in FIG. 6b the dynamic axial stiffness of the mount will be reduced and may be lower than the overall static axial stiffness. The desired requirements for a practical system of high static stiffness and a low dynamic stiffness, as mentioned above, is thus achieved.

FIG. 7 shows a body mount 50 having a flange 51 to be secured to the body of the vehicle. The associated Macpherson strut damper rod 53 has a shoulder 54 fitted into a corresponding socket formed in a collar 55 supported within the mounting by an annular spring member 56 which is bonded to the collar and to an annular precompressed sleeve 57 which is sealed into a casing 60 and sealed by an annular rubber insert 61 formed integrally with the spring member 56.

A sleeve 63 is fitted slidably on a reduced-diameter portion 64 of the rod 53 and is clamped against an O-ring seal 65 by a nut 66 engaging a screw-threaded portion of the rod and bearing against a rebound stop washer 68. A bump stop is provided by an annular ridge 70 formed integrally with the spring member 56.

A second annular spring member 72 is bound between the casing 60 and the sleeve 63, thus enclosing the upper portion of a sealed chamber 74 into which a nozzle 75 is suitable secured. A flexible pipe 76 is attached to the nozzle 75 and leads to an associated engine mount. A pressurising valve (not shown) is provided.

A plate 80 to receive the upper end of the main suspension coil spring is rotatably mounted beneath the collar 55 by a ball race 81.

Another version of a body mount in accordance with the invention is illustrated in FIG. 8. This incorporates a collar 90 mounted in a flange 91 by means of an annular rubber spring member 92 bonded to the flange and to the collar and in this case a sealed chamber 94 is formed between a domed cap 95 and a butyl rubber cover member 96 which also has the function of providing a bump stop, the cover member being thickened for this purpose. An outer annular lip 97 of the cover member 96 is arranged to be clamped in a groove between the cap 95 and the flange 91 by suitable screws passing through the cap and the flange which may also serve to secure the mount to the vehicle body. The central portion of the cover member 96 is supported by a rigid metal dome 98. Remaining features of the mount shown in FIG. 8 are broadly similar to those of FIG. 7, but the construction of FIG. 8 has the advantage of providing greater compliance to accommodate tilting of the strut damper rod 99. A further advantage lies in the reduction in the number of bonded spring members from two to one, and an improved sealing arrangement. On the other hand, access to the nut 100 is dependent on removal of the cap 95.

FIG. 9 shows an engine mount of the general kind illustrated in FIG. 6a, in the pre-installa-tion condition. A casing 110 is sealed by an annular elastomeric spring member 112 which is held in pre-compression between a bonded sleeve 114 and a bonded central support plate 115 having a captive screw 116 for attachment to the engine. Annular ribs 118 and 119 provide bump and rebound stops respectively, and an integral seal 120 is compressed during assembly to seal a chamber 122 to which a nozzle 123 is suit-ably secured to enable the chamber to be connected via a flexible pipe 125 to an associated body mount. Means (not shown) is provided on the engine mount, body mount or connecting pipe to pressurise the chamber 122 with air or other suitable gas. A screw 124, suitably sealed to the casing, is provided to attach the mount to a vehicle chassis member. An apertured cover and clamping plate 126 provides a rebound abutment and a clamp for the outer parts of the spring assembly.

FIG. 10 shows the engine mount of FIG. 9 in its working condition. It will be noted that the spring member 112 is now in a highly radially compressed state.

FIG. 11 shows a pre-loaded engine mount 130 which is designed with the incorporation of a steel coil spring 132 to apply an increased static load in addition to that provided by the engine weight, enabling a higher static gas pressure to be employed in the chamber 134. The steel spring 132 opposes the axial force due to the air pressure in the chamber 134 and thus supplements the weight of the engine, its spring rate being chosen so that an elastomeric diaphragm 136 which seals the chamber 134 is relatively undeflected in an axial direction in its normal static working position. The diaphragm 136 may be unreinforced, or may be reinforced with a fabric or fibre reinforcement of conventional type to reduce any tendency to elongate and bulge under the air pressure from chamber 134.

One advantage of the kind of diaphragm illustrated in FIG. 11 is the low radial stiffness which it provides relative to that of the rubber spring member 112 of FIGS. 9 and 10.

The general structure of the engine mount of FIG. 11 is similar to that of the mount shown in FIGS. 9 and 10, with the exceptions that the spring 132 is provided, mounted between a rubber grommet 140 secured in a cover member 141 and an integrally moulded rubber seating 142 formed inside a cup-shaped central support plate 144. A securing screw 145 and spacer sleeve 146 are provided to enable the mount to be secured to an engine. The rubber grommet 140, spring 132 and rubber seating 142 provide a rebound stop (the spring coils closing together on full rebound).

A further advantage of the engine mount of FIG. 11 is that by using a relatively low-stiffness steel spring the resulting composite pre-loaded spring has a low dynamic axial stiffness in relation to its effective static axial stiffness produced by considerable pre-compression of the spring.

Although the above described embodiments are for vehicles having Macpherson-type suspension units, it will be appreciated that the engine mounting arrangement according to the invention could be used with other suspension types. The preferred arrange-ment for a vehicle is for there to be a pair of engine mounts as described above each associated with a repective suspension unit but it will be appreciated that other combinations and numbers of engine mounts could be used.

Preferably, the engine mounts incorporated in the system in accordance with the invention support most of the engine weight. The remaining portion of the weight will normally be supported by one or more relatively lightly loaded additional mounts suitably positioned to stabilize the engine : the system is designed so that the additional engine mount or mounts have relatively little effect on the functional characteristics of the arrangement described.

We claim:

1. A mounting arrangement for a vehicle engine of the kind comprising means for mounting the engine of a vehicle to a body of the vehicle, which mounting means comprises a first fluid-tight chamber of variable volume which contains gas and which is arranged between the engine and the body so that weight of the engine tends to reduce a volume of the chamber, means for supporting the body on a suspension system of the vehicle, which supporting means includes a second fluid-tight chamber of variable volume which contains gas and is arranged so that a load of the body on the suspension system tends to reduce the volume of the second chamber, the means for mounting the engine being physically separated from the means for supporting the body, conduit means interconnecting the first and second fluid-tight chambers with one another so that relative movement between the engine and body and between the body and the suspension system alters pressure of gas within the respective chambers and the change in gas pressure in one chamber is communicated to the other of the chambers whereby dynamic forces exerted on the body via the second chamber tend to be counteracted by corresponding oppositely directed forces exerted on the body via the first chamber.

2. A mounting arrangement for a vehicle engine of the kind comprising means for mounting the engine of a vehicle to a body of the vehicle, which mounting means comprises a first gas-tight chamber of variable volume which contains gas and which is arranged between the engine and the body so that weight of the engine tends to reduce a volume of the chamber, means for supporting the body on a suspension system for the vehicle, which supporting means includes a second gas-tight chamber of variable volume, which chamber contains gas and is arranged so that a load of the body on the suspension system tends to reduce the volume of the second chamber, a gas conduit means between the first and second chambers, connected so that relative movement bewteen the engine and body and between the body and suspension system alters pressure of the gas in the respective chambers, which change in gas pressure in one chamber is communicated to the other of the chamber, the arrangement acting to tend to bring into phase vibrational movements of the body and engine, effective pressurized areas as herein defined of the mounting means and supporting means being approximately equal and a natural frequency of vibration of the body on the supporting means without the second chamber being approximately equal to the natural requency of vibration of the engine on the effective gas spring as herein defined.

3. A mounting arrangement as claimed in claim 2 wherein the gas pressure is greater than atmospheric.

4. A mounting arrangement as claimed in claim 2 wherein the height of the first chamber is greater than the height of the second chamber.

5. A mounting arrangement as claimed in claim 2 wherein the gas communication between the two chambers includes restricting means for damping the flow of gas therethrough.

6. A mounting arrangement as claimed in claim 2 wherein the mounting means comprises a flexible resilient member connected between the body and the engine.

7. A mounting arrangement as claimed in claim 6 wherein when the first chamber contains gas under pressure, the gas contributes substantial stiffness to the mounting means.

8. A mounting arrangement as claimed in claim 6 wherein when the first chamber contains gas under pressure and the engine and body are in static equilibrium, the mounting means has a low dynamic stiffness compared with its static stiffness.

9. A mounting arrangement as claimed in claim 2 wherein the supporting means comprises an element of flexible resilient material connected between the body and the suspension system.

10. A mounting arrangement as claimed in claim 9 wherein the second chamber is bounded in part by the element.

11. A mounting arrangement as claimed in claim 9 wherein the supporting means comprises a second element of flexible resilient material connected between the body and the suspension system.

12. A mounting arrangement as claimed in claim 11 wherein the second chamber is bounded in part by the second element.

13. A mounting arrangement as claimed in claim 2 wherein the second chamber comprises an annular elastomeric spring member bonded at its inner periphery to a collar arranged to be engageable around a strut damper rod and at its outer periphery to a casing, a second annular elastomeric spring member being bonded at its outer periphery to the casing and at its inner periphery to a sleeve arranged to be fitted around said strut damper rod, said sleeve being arranged to be sealingly clamped against the collar to form the variable volume chamber between the two annular spring members.

14. A mounting arrangement as claimed in claim 2 wherein the second chamber comprises an annular rubber spring member bonded at its inner periphery to a collar arranged to be engageable around a strut damper rod and at its outer periphery to a flange, an elastomeric cover member being provided over the annular spring member and sealed to the flange by a cap so as to form the variable volume chamber between the cover member and the cap.

15. A mounting arrangement as claimed in claim 14 wherein a rigid dome is provided to support the central portion of the cover member, the said central portion being of sufficient thickness to provide a bump stop.

16. A mounting arrangement as claimed in claim 2 wherein the first chamber is provided in a casing having an elastomeric spring member bonded at its outer periphery to the casing and at its inner periphery to a central support, the spring member being pre-compressed between the casing and the support.

17. A mounting arrangement as claimed in claim 16 wherein annular ribs are formed integrally with the spring member so as to be engageable with the casing to provide a bump stop and rebound stop.

18. A mounting arrangement as claimed in claim 2 wherein the first chamber is provided in a casing having an elastomeric diaphragm mounted between the casing and a central support to seal the said first chamber, a spring being provided between a cover member of the casing and the central support to apply a pre-load in opposition to the axial force due to gas pressure in the said first chamber

* * * * *